US006780222B2

(12) United States Patent
Roe

(10) Patent No.: US 6,780,222 B2
(45) Date of Patent: Aug. 24, 2004

(54) METHOD OF SINTERING AND SINTER BED COMPOSITION

(75) Inventor: Donald C. Roe, Jamison, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/220,595

(22) PCT Filed: Mar. 6, 2001

(86) PCT No.: PCT/US01/07191

§ 371 (c)(1),
(2), (4) Date: Sep. 3, 2002

(87) PCT Pub. No.: WO01/66810

PCT Pub. Date: Sep. 13, 2001

(65) Prior Publication Data

US 2003/0041693 A1 Mar. 6, 2003

(51) Int. Cl.$^7$ .................................................. C22B 1/20
(52) U.S. Cl. .......................................... 75/767; 75/769
(58) Field of Search .......................... 75/767, 769, 319, 75/324, 712

(56) References Cited

U.S. PATENT DOCUMENTS

| | | | | |
|---|---|---|---|---|
| 3,770,416 A | * | 11/1973 | Goksel | ........................ 75/504 |
| 4,802,914 A | * | 2/1989 | Rosen et al. | .................. 75/321 |
| 5,147,452 A | * | 9/1992 | Anderson et al. | ............. 75/767 |
| 6,293,994 B1 | * | 9/2001 | Field et al. | .................... 75/772 |

* cited by examiner

*Primary Examiner*—Melvyn Andrews
(74) *Attorney, Agent, or Firm*—Steven D. Boyd

(57) ABSTRACT

A method for agglomerating and sintering iron and zinc ore and ore concentrates, steel mill ferrous waste and zinc mill waste. The method has the steps: a) mixing the wastes or ore with a combustion fuel source, and a sinter agglomeration agent selected from the group consisting of sodium silicate, water soluble polymers and aqueous emulsions of oils to form an agglomerated sinterable mixture comprising agglomerated particles; b) forming the sinterable mixture into a sinter bed on the grate of a sinter machine; and c) igniting the sinter bed to create a temperature sufficient to sinter the agglomerated particles.

18 Claims, No Drawings

METHOD OF SINTERING AND SINTER BED COMPOSITION

FIELD OF THE INVENTION

This invention relates to a method for agglomerating and sintering iron and zinc ore and ore concentrates, steel mill ferrous waste and zinc mill waste. It also relates to sinter bed compositions comprising agglomerated particles of steel mill ferrous wastes or zinc mill wastes.

BACKGROUND OF THE INVENTION

A variety of iron or zinc rich by-products is produced in steel or zinc mills respectively. These by-products, generally referred to as mill wastes, principally comprise mill scale, various dusts, including ore fines, furnace dusts, open hearth dusts, basic oxygen dusts, open hearth dusts blast furnace flue dusts, spark box fines and grit chamber dusts, and sludges produced at various points in the mills. These by-products may contain a substantial amount of iron or zinc, as the case may be, and the balance is composed of various other materials such as carbon, lime, slag, silica, etc. The large particles of mill waste can be screened out and returned to the blast furnace, but the finer particles must be agglomerated before they are reused.

The major way of agglomerating the mill wastes before reuse is known as sintering. The sintering process is essentially the recycling center for the mill, allowing the by-product materials to be used to increase the yield of steel and/or zinc. In conventional sintering processes the waste material, generally intimately mixed with finely divided fuel such as coke or anthracite, is agglomerated by tumbling it in a drum while it is sprayed with water. The wet agglomerated material is then fed to the traveling grate of a sintering machine where it is formed into a uniform homogeneous bed known as the sinter bed. Near the head or feed end of the grate, the bed is ignited on the surface, and as the mixture moves along on the traveling grate, air is pulled down through the mixture to burn the fuel by downdraft combustion. As the grate moves towards the discharge end, the combustion front in the bed moves progressively downward. This creates sufficient heat and temperature, about 1300° C. to about 1500° C., to sinter the fine particles together into porous clinkers.

In this process, high permeability of the sinter bed is important in order to obtain rapid and uniform sintering. The height of the sinter bed, and consequently the amount of material that can be sintered in a given time, is limited by fines which can develop when the agglomeration water evaporates, and which blind the permeability of the sinter bed.

There is a need in the industry for agglomeration agents which will minimize the amount of fines and thus allow higher sinter bed heights to be utilized.

SUMMARY OF THE INVENTION

According to the present invention there is provided a method for agglomerating and sintering iron and zinc ore and ore concentrates, steel mill ferrous waste and zinc mill waste, comprising: a) mixing the wastes or ore with a combustion fuel source, and a sinter agglomeration agent selected from the group consisting of sodium silicate, water soluble polymers and aqueous emulsions of oils to form an agglomerated sinterable mixture comprising agglomerated particles; b) forming the sinterable mixture into a sinter bed on the grate of a sinter machine; and c) igniting the sinter bed to create a temperature sufficient to sinter the agglomerated particles.

In another embodiment of the invention there is provided a sinter bed composition comprising agglomerated particles of steel mill ferrous wastes or zinc mill wastes comprising a sinter agglomeration agent selected from the group consisting of sodium silicate, water soluble polymers and oil.

DETAILED DESCRIPTION OF THE INVENTION

The sinter agglomeration agents for the purposes of this invention are selected from the group consisting of sodium silicates, water soluble polymers and aqueous emulsions of oils.

Sodium silicates, also known as water glass, are preferably derived from water soluble sodium silicate glasses. Typically, they are solutions of sodium oxide ($Na_2O$) and silicon dioxide ($SiO_2$) combined in various ratios. Examples of acceptable sodium silicates include Sodium Silicate D, Sodium Silicate K and Sodium Silicate N, all available from PQ Corporation. The sodium silicates of the present invention generally have $SiO_2$ to $Na_2O$ weight ratios in the range of about 1.6 to about 3.9. The preferred range of $SiO_2$ to $Na_2O$ weight ratios ranges from about 2 to about 3.2. The sodium silicate will preferably be applied in water solution. The solids level of these aqueous solutions preferably range from about 10% to about 50%, and more preferably from about 25% to about 40%.

Preferable water soluble polymers for use in the invention include polyethers, polyether derivatives and water soluble cellulose derivatives. Preferred polyethers, and derivatives thereof, are polyethylene oxides, polypropylene oxides, and polyethylene oxide-propylene oxide copolymers. The polyethylene oxides, and derivatives thereof, have the following general formula:

wherein R is —OH or $C_1$–$C_6$ alkoxy, $R_1$, is —H or $C_1$–$C_6$ alkyl, and n is from about 5 to about 100,000. Polypropylene oxides, and derivatives thereof, have the general formula:

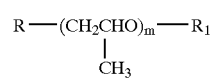

wherein R is —OH or $C_1$–$C_6$ alkoxy $R_1$, is —H or $C_1$–$C_6$ alkyl, and m is from about 5 to about 100,000. Polyethylene oxide-polypropylene oxide copolymers and their derivatives have the general formula:

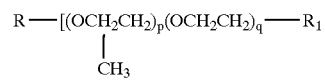

wherein R is —OH or $C_1$–$C_6$ alkoxy, $R_1$, is —H or $C_1$–$C_6$, and p and q are integers from about 5 to about 100,000.

Preferred polyethers for use in the invention are polyethylene oxide compounds including polyethylene oxide and methoxy polyethylene glycol. The polyethylene oxide materials, polyethylene glycol and methoxy polyethylene glycol, are relatively non-volatile volatile and thermally stable. Their physical form ranges from viscous liquids to waxy solids. The polyethylene oxide polymers of the invention and their derivatives preferably have molecular weights in the range of about 200 to about 5,000,000, and more preferably in the range of about 100,000 to about 1,000,000.

Polyethylene oxide compounds employed are commercially available from Union Carbide Corporation. Preferred compounds include polyethylene oxide (MW=300,000) available as Polyox® WSR N750 and polyethylene glycol (MW=3,350) available as Carbowax® 3350.

Additives can be used to improve the stability and properties of the polyethylene oxide compounds for the purpose of the invention. These include lignosulfonates, wetting agents, solution stabilizers (alcohols), thermal stabilizers (antioxidants) and plasticizing agents. Anionic, cationic and/or nonionic surfactants can be employed to improve the wetting properties of the polyethylene oxide compounds.

Preferred water soluble cellulose derivatives for use is the invention include cellulose ethers and esters. The molecular weight of the operable materials is not critical, but is generally in the range of about 10,000 to about 500,000. Examples of such preferred materials include hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methyl cellulose (MC), methylhydroxypropyl cellulose (MHPC), methylhydroxyethyl cellulose (MHEC), carboxymethylmethyl cellulose (CMMC) and mixtures thereof. Particularly preferred water soluble cellulose derivatives include methyl cellulose, methylhydroxypropyl cellulose and hydroxyethyl cellulose.

The cellulose derivatives of the invention can also be used with other additives for improving their performance as sintering agents. Plasticizers may be useful under certain temperature conditions. These include, for example, diethylene glycol, propylene glycol, triethanolamine, glycerol and sorbitol. Additives such as sucrose and glycerol can be used to lower the gel point temperature of aqueous solutions of the cellulose derivatives, which could be beneficial under some conditions.

The water soluble polymers of the invention will preferably be applied to the mill waste in water solution. The solids level of these aqueous solutions preferably range from about 0.1% to about 25%, and more preferably from about 0.5% to about 10%.

The oils preferred for use in the aqueous oil emulsions of the invention are oils that are capable of being emulsified in an oil-in-water or water-in-oil emulsion, for example, asphalts, extender oils of the types noted in U.S. Pat. No. 4,571,116, which is incorporated herein by reference in its entirety, heavy process oils, and light process oils. The heavy process oils are of the type specified by Kittle, U.S. Pat. No. 4,561,905, which is incorporated herein by reference in its entirety. That is, they include asphalt "cut-backs", i.e., asphalt dissolved in a moderately heavy oil such as No. 3 fuel oil, residual fuel oils of relatively high viscosity such as No. 6 fuel oil, etc. The heavy process oils may be further defined as having viscosities in the range of about 600–7,000 SUS. One exemplary heavy process oil is Hydrolene®90 sold by Sun Oil Company. This product is a low volatility aromatic oil having an SUS viscosity of about 3,500 at 38° C. Preferred oils are classified as "light viscosity process oils." These have SUS viscosities of about 60–600 measured at 38° C. Most preferred are those having an SUS viscosity of from about 200–400. These are commercially available under the Shellflex®, Tellura®, and Tufflo® trademarks.

Surfactants may be used to emulsify the oil/water mixture. For this purpose, well known and commercially available anionic, cationic or nonionic surfactants suffice. Anionic and nonionic surfactants are most preferred. Examples of acceptable anionic surfactants include alkyl aryl sulfonic acids, alkyl sulfonic acids, alkenyl sulfonic acids, sulfonated alkyds, sulfated monoglycerides, and sulfated fatty esters. Also, long chain alpha olefin sulfonates, water soluble salts of alkenyl sulfonic acids, water soluble alkyl aryl sulfonic acid salts, water soluble salts of sodium lauryl sulfate, etc. may be mentioned. Nonionic surfactants include, for example, ethylene oxide condensates of alkyl phenols, ethylene oxide condensates of fatty acids, fatty acid amides, etc. Additional operable surfactants are well known to those skilled in the art.

Performance of the oil emulsions may be enhanced by including in the emulsion composition one or more water insoluble elastomeric polymers. These oil emulsions containing water-insoluble elastomeric polymers are disclosed and discussed in U.S. Pat. No. 4,780,233, which is incorporated herein in its entirety by reference. Elastomers useful in the invention are described in U.S. Pat. Nos. 4,551,261 and 2,854,347, both of which are incorporated herein by reference in their entireties. Polymers preferred for use in the invention are synthetic rubber-like polymers encompassing copolymers of butadiene with monoolefinic monomers such as styrene, methylstyrene, dimethylstyrene and acrylonitrile. Copolymers of methyl, ethyl, and butyl acrylates with acrylonitrile or with styrene may also be suitable. Plasticized polyvinyl acetate, plasticized polyvinyl chloride, plasticized polystyrene, plasticized substituted polystyrenes, and plasticized polyolefins such as polyethylenes and polyisobutylenes are also suitable. If water insoluble elastomers are used as a component of the oil emulsions, it is generally not necessary to use more than about 0.1 wt. % based on the weight of the oil present.

With regard to the sintering process, in the first step the feed material is intimately mixed with a fuel source in a mixer such as a balling-drum or disc-pelletizer mixer. The fuel is typically finely divided coke or coal, particularly anthracite coal or coke breeze. During the mixing it is common to spray the contents of the mixer with water to help in the agglomeration of feed material. The mixers are operated to produce small nodules or agglomerated particles, preferably about 6 to about 25 mm in size. Mixer retention times vary depending upon the ease with which the feed balls. Desirable mixer retention times vary from about one to about five minutes.

The agglomeration agents of the invention may be mixed with the feed before it is added to the mixer, but most preferably in the practice of the invention, the agglomeration agents will be added after the feed has been loaded to the mixer. It is convenient to add the agents by dissolving in or mixing with the water agglomeration that is sprayed in the mixer. However it is also possible to add the agglomeration agents separately from the sprayed water, or even in place of it.

The effective amount of agglomeration agent used will depend on a variety of factors, including the composition of the feed to the mixer, the type of mixer used, and the particular agglomeration agent employed. Nevertheless, it has been found that the effective amount is preferably from about 0.0001 wt. % to about 5 wt. % on a dry basis of the dry weight of the sinterable mixture. More preferably the amount is from about 0.005 wt. % to about 2 wt. %, and most preferably from about 0.001 wt. % to about 1 wt. % percent.

In transferring the agglomerated mix from the mixer to the grate of the sintering machine it is essential to provide a uniform, homogeneous bed, and to prevent compacting of the bed. The height of the sinter bed is limited by the amount of fines or dust, which may form when the bed material dries. The fines blind the permeability of the sinter bed, and thus limit its height. Consequently, it is necessary to minimize the amount of fines in order to achieve a high sinter bed height. It is a great advantage of the invention that the agglomeration agents substantially reduce the level of fines, and therefore use of the agglomeration agents is found to allow the use of higher height sinter beds with less compacting, improved permeability, and more rapid and uniform sintering when compared to sinter beds that is the same except that they do not contain the sinter agglomeration agents of the invention.

What is claimed is:

1. A method for agglomerating and sintering iron and zinc ore and ore concentrates, steel mill ferrous waste and zinc mill waste, comprising:

a) mixing the mill wastes or ore with a combustion fuel source, and a sinter agglomeration agent selected from the group consisting of sodium silicate, water soluble polymers and aqueous emulsions of oils to form an agglomerated sinterable mixture comprising agglomerated particles;

b) forming the sinterable mixture into a sinter bed on the grate of a sinter machine; and c) igniting the sinter bed to create a temperature sufficient to sinter the agglomerated particles.

2. The method of claim 1 wherein the size of the agglomerated particles is from about 6 mm to about 25 mm.

3. The method of claim 1 wherein the waste is steel mill ferrous waste selected from the group consisting of mill scale, precipitator dust, slag fines, filter cake, iron ore, ferroalloy ores and fines.

4. The method of claim 1 wherein the waste is zinc mill waste selected from the group consisting of mill scale, precipitator dust, slag fines, filter cake, zinc ores, and fines.

5. The method of claim 1 wherein the combustion fuel source is selected from the group consisting of coke and coal.

6. The method of claim 1 wherein the sintering temperature is from about 1100° C. to about 1500° C.

7. The method of claim 1 wherein said water soluble polyether selected from the group consisting of:

a) polyethylene oxides and polyethylene oxide derivatives having the formula

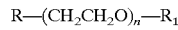

wherein R is —OH or $C_1$–$C_6$ alkoxy, $R_1$, is —H or $C_1$–$C_6$ alkyl, and n is from about 5 to about 100,000;

b) polypropylene oxides and derivatives having the general formula:

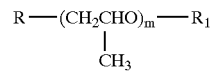

wherein R is —OH or $C_1$–$C_6$ alkoxy $R_1$, is —H or $C_1$–$C_6$ alkyl, and m is from about 5 to about 100,000; and c) polyethylene oxide-polypropylene oxide copolymers and their derivatives having the general formula:

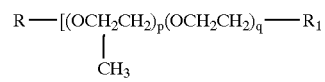

wherein R is —OH or $C_1$–$C_6$ alkoxy, $R_1$, is —H or $C_1$–$C_6$, and p and q are integers from about 5 to about 100,000.

8. The method of claim 7 wherein the polyether is a polyethylene oxide having the formula R—$(CH_2CH_2O)_n$—$R_1$, wherein R is —OH or —$OCH_3$, $R_1$, is —H or —$CH_3$, and n is from about 5 to about 100,000.

9. The method of claim 7 wherein the polyether is a polyethylene oxide having a molecular weight from about 100,000 to about 5,000,000.

10. The method of claim 7 wherein the polyether is a polyethylene oxide having a molecular weight from about 100,000 to about 1,000,000.

11. The method of claim 1 wherein the sinter agglomeration agent is used at a level of from about 0.0001% to about 5% on a dry basis based on the dry weight of the sinterable mixture.

12. The method of claim 1 wherein the sinter agglomeration agent is used at a level of from about 0.0005% to about 2% on a dry basis based on the dry weight of the sinterable mixture.

13. The method of claim 1 wherein the sinter agglomeration agent is used at a level of from about 0.001% to about 1% on a dry basis based on the dry weight of the sinterable mixture.

14. The method of claim 1 further comprising mixing the steel mill ferrous waste with water.

15. The method of claim 1 wherein the mixing takes place in a balling-drum or disc-pellitizer mixer.

16. The method of claim 1 wherein the sinter agglomeration agent comprises a polyethylene oxide compound having the formula R—$(CH_2CH_2O)_n$—$R_1$ wherein R and $R_1$, which may be the same or different, are —H, —OH or $CH_3O$—, and n is from about 13 to about 2,000, used at a level of from about 0.0001% to about 5% on a dry basis based on the dry weight of the sinterable mixture.

17. The method of claim 1 wherein the sinter agglomeration agent is dissolved in water when it is mixed with the mill waste.

18. The method of claim 1 wherein the sinter agglomeration agent is mixed with water before addition to the waste.

* * * * *